US008707455B2

(12) United States Patent
Nakano et al.

(10) Patent No.: US 8,707,455 B2
(45) Date of Patent: Apr. 22, 2014

(54) CONTENT PLAYBACK APPARATUS AND CONTENT PLAYBACK METHOD

(75) Inventors: Shinichiro Nakano, Kawasaki (JP); Hiroyuki Chaki, Akiruno (JP); Akiko Yamaguchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 357 days.

(21) Appl. No.: 12/721,385

(22) Filed: Mar. 10, 2010

(65) Prior Publication Data

US 2010/0269176 A1 Oct. 21, 2010

(30) Foreign Application Priority Data

Apr. 17, 2009 (JP) ................................. 2009-101125

(51) Int. Cl.
*H04L 29/06* (2006.01)
(52) U.S. Cl.
USPC .................... 726/29; 726/26; 726/27; 726/30
(58) Field of Classification Search
USPC ........................................ 726/29, 26, 27, 30
See application file for complete search history.

(56) References Cited

U.S. PATENT DOCUMENTS

| | | | | |
|---|---|---|---|---|
| 2002/0040475 A1* | 4/2002 | Yap et al. | .......................... | 725/39 |
| 2002/0054750 A1* | 5/2002 | Ficco et al. | ...................... | 386/46 |
| 2002/0092021 A1* | 7/2002 | Yap et al. | .......................... | 725/55 |
| 2002/0100052 A1* | 7/2002 | Daniels | ........................... | 725/87 |
| 2002/0131765 A1* | 9/2002 | DeKeyser et al. | .............. | 386/70 |
| 2002/0154888 A1* | 10/2002 | Allen et al. | ...................... | 386/46 |
| 2002/0191116 A1* | 12/2002 | Kessler et al. | ................. | 348/723 |
| 2003/0009756 A1* | 1/2003 | Moir | ............................... | 725/37 |
| 2003/0026589 A1* | 2/2003 | Barton et al. | .................... | 386/46 |
| 2003/0043847 A1* | 3/2003 | Haddad | .......................... | 370/473 |
| 2003/0044166 A1* | 3/2003 | Haddad | .......................... | 386/111 |
| 2003/0044170 A1* | 3/2003 | Haddad et al. | ................. | 386/124 |
| 2003/0086696 A1* | 5/2003 | Adolph et al. | .................. | 386/95 |
| 2003/0091337 A1* | 5/2003 | Kubsch et al. | .................. | 386/95 |
| 2003/0188320 A1* | 10/2003 | Shing | ............................. | 725/131 |
| 2004/0096198 A1* | 5/2004 | Lee | .................................. | 386/111 |
| 2004/0146274 A1* | 7/2004 | Ishibashi | .......................... | 386/46 |
| 2004/0146282 A1* | 7/2004 | Lee | .................................. | 386/95 |
| 2005/0055717 A1* | 3/2005 | Daniels | ........................... | 725/58 |

(Continued)

FOREIGN PATENT DOCUMENTS

JP 2006-106928 4/2006
JP 2006-313517 11/2006

(Continued)

OTHER PUBLICATIONS

Japanese Patent Application No. 2009-101125, Final Office Action, mailed Aug. 3, 2010, (with English Translation).
Deborah Radcliffe, U.S.'s Most Feared Online Fraud Comes to Japan: Phising Fraud, Network World, Japan, IDG Japan Corporation, Nov. 1, 2004, vol. 9, No. 11, p. 78 to p. 87.

*Primary Examiner* — Bradley Holder
(74) *Attorney, Agent, or Firm* — Blakely, Sokoloff, Taylor & Zafman LLP

(57) ABSTRACT

According to one embodiment, a content playback apparatus which acquires desired content from a specific site accessed via a network and plays back the acquired content, comprises a determination module configured to determine, when a data input request is received from a currently accessed site, whether or not the site is at least a site included in the specific site, and a controller configured to generate, when the determination module determines that the currently accessed site is not included in the specific site, a warning that advises accordingly.

9 Claims, 7 Drawing Sheets

(56) References Cited

U.S. PATENT DOCUMENTS

| | | | |
|---|---|---|---|
| 2005/0055730 A1* | 3/2005 | Daniels | 725/134 |
| 2005/0138672 A1* | 6/2005 | Stone | 725/134 |
| 2006/0041905 A1* | 2/2006 | Wasilewski | 725/31 |
| 2006/0115058 A1* | 6/2006 | Alexander et al. | 379/90.01 |
| 2006/0136966 A1* | 6/2006 | Folk | 725/58 |
| 2006/0253446 A1 | 11/2006 | Leong et al. | |
| 2009/0089426 A1 | 4/2009 | Yamasaki et al. | |
| 2010/0229215 A1 | 9/2010 | Goto | |

FOREIGN PATENT DOCUMENTS

| | | | |
|---|---|---|---|
| JP | 2007-122692 | | 5/2007 |
| JP | 2007-310781 | | 11/2007 |
| JP | 2008-193284 | | 8/2008 |
| JP | 2009-033630 | | 2/2009 |
| WO | WO 01/33857 | * | 5/2001 |
| WO | WO 2007/037524 | * | 4/2007 |

* cited by examiner

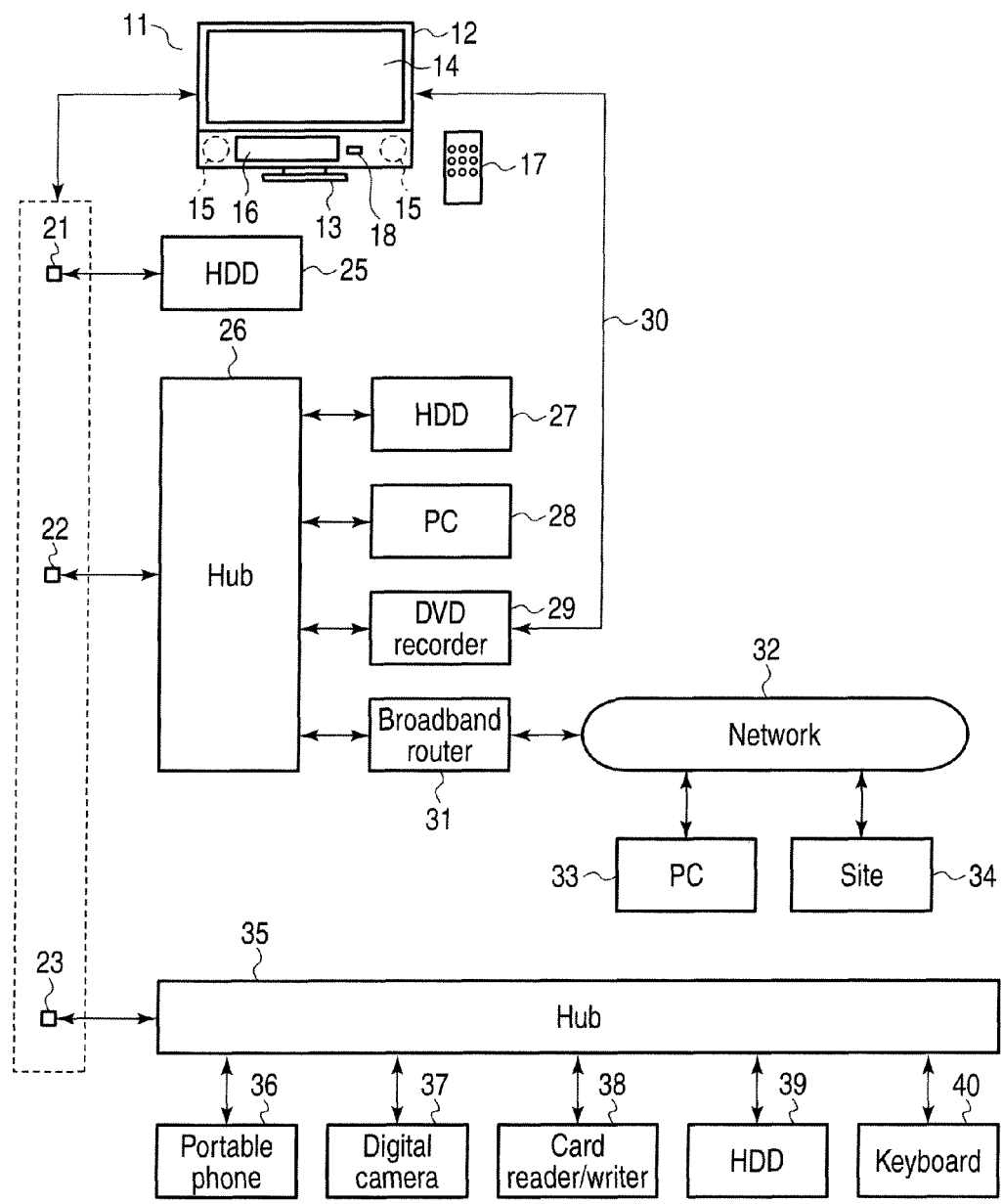
F I G. 1

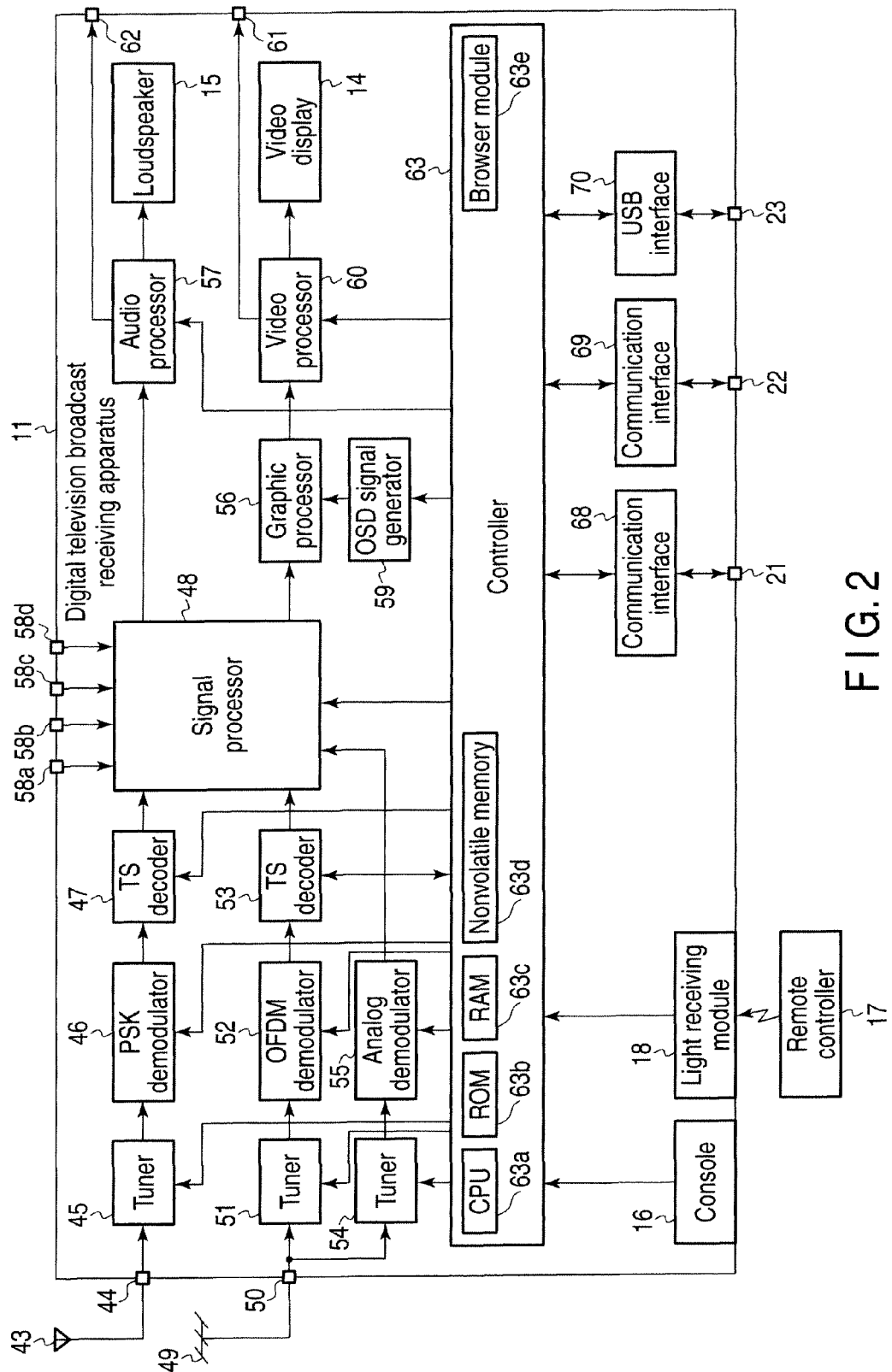
F I G. 2

CONTENT PLAYBACK APPARATUS AND CONTENT PLAYBACK METHOD

CROSS-REFERENCE TO RELATED APPLICATIONS

This application is based upon and claims the benefit of priority from Japanese Patent Application No. 2009-101125, filed Apr. 17, 2009, the entire contents of which are incorporated herein by reference.

BACKGROUND

1. Field

One embodiment of the invention relates to improvements of a content playback apparatus and content playback method, which allow to acquire and play back desired content by accessing a specific site via a network such as the Internet.

2. Description of the Related Art

As is well known, in recent years, a switchover from analog television broadcasting to digital has been underway. For example, in Japan, in addition to digital direct broadcasting by satellite (digital DBS), terrestrial digital broadcasting has begun.

Nowadays, a technique for delivering content including video and audio data via the Internet is put into practical use. Especially, a so-called video on demand (VOD) service has prevailed. That is, with this service, when the user requests a specific site to provide desired content, the specific site individually provides the requested content to the user.

For this reason, a digital broadcast receiving apparatus which receives the aforementioned digital television broadcasting tends to mount a function that supports the VOD service, i.e., a function of accessing a specific site via a network to request to provide desired content, and receiving and playing back content transmitted from that specific site.

In such a digital broadcast receiving apparatus which can receive content via the network, upon accessing the specific site via the network, a service other than that provided by that specific site can be browsed, and content provided by that service can also be acquired.

However, when the user repeats operations to browse a service other than that provided by the specific site, and to browse another service linked in that service, he or she often jumps to another site other than the specific site he or she accessed first, and browses a service on that site without even noticing.

In such case, when the user inputs his or her user identification (ID) and password to log on to a service to be browsed, user's personal information may externally leak. Especially, when the user jumps to a malicious site, a serious problem for the user may be posed.

Jpn. Pat. Appln. KOKAI Publication No. 2008-193284 discloses a technique which creates a video content list that sorts video content of the VOD service based on predetermined rules such as ranking, new arrivals, viewing histories, and the like, and sequentially receives and plays back a plurality of video content items in the video content list by operating a channel up or down button of a remote controller.

Also, Jpn. Pat. Appln. KOKAI Publication No. 2006-106928 discloses an access prevention technique which always displays information of an owner (company) of a currently accessed site, and allows the user to confirm if he or she is accessing a site he or she intended, thereby reducing the risk of becoming a victim of phishing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a diagram for explaining an example of a digital television broadcast receiving apparatus and a network system configured around that apparatus according to an embodiment of the invention;

FIG. 2 is a block diagram for explaining the arrangement of a principal signal processing system of the digital television broadcast receiving apparatus according to the embodiment;

DETAILED DESCRIPTION

Figure 3:
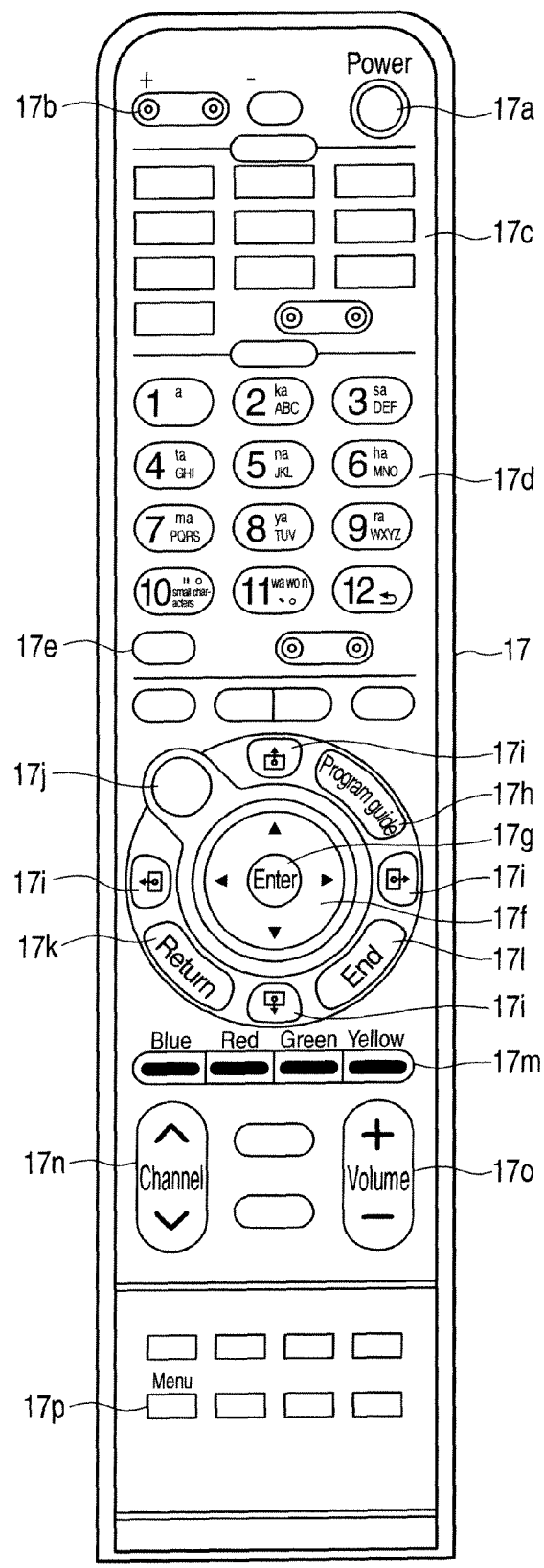
FIG. 3 is an external view for explaining a remote controller of the digital television broadcast receiving apparatus according to the embodiment.

Various embodiments according to the invention will be described hereinafter with reference to the accompanying drawings. In general, according to one embodiment of the invention, a content playback apparatus which acquires desired content from a specific site accessed via a network and plays back the acquired content, comprises: a determination module configured to determine, when a data input request is received from a currently accessed site, whether or not the site is at least a site included in the specific site; and a controller configured to generate, when the determination module determines that the currently accessed site is not included in the specific site, a warning that advises accordingly.

FIG. 1 schematically shows the outer appearance of a digital television broadcast receiving apparatus 11 to be described in this embodiment, and an example of a network system which is configured around this digital television broadcast receiving apparatus 11.

That is, the digital television broadcast receiving apparatus 11 is mainly configured by a flat cabinet 12 and a support base 13 which supports this cabinet 12 to stand it up. In this cabinet 12, a video display 14 as a flat panel type display including, e.g., a liquid crystal display panel, a pair of loudspeakers 15, a console 16, a light receiving module 18 which receives operation data transmitted from a remote controller 17, and the like are arranged.

The digital television broadcast receiving apparatus 11 includes a first local area network (LAN) terminal 21, second LAN terminal 22, and Universal Serial Bus (USB) terminal 23.

Of these terminals, the first LAN terminal 21 is used as a LAN-compatible HDD dedicated port, and is used to record and reproduce data in and from a LAN-compatible hard disk drive (HDD) 25 as connected network-attached storage (NAS) via Ethernet®.

In this manner, by arranging the first LAN terminal 21 as the LAN-compatible HDD dedicated port, program data with high-definition quality can be stably recorded in the HDD 25 without being influenced by other network environments, network use statuses, and the like.

The second LAN terminal 22 is used as a general LAN-compatible port using Ethernet®, and is used to connect apparatuses such as a LAN-compatible HDD 27, personal computer (PC) 28, and Digital Versatile Disk (DVD) recorder 29 which incorporates an HDD and has a digital broadcast receiving function, via a hub 26, and to exchange data with these apparatuses.

Note that a dedicated analog transmission path 30 is required to be arranged between the DVD recorder 29 and digital television broadcast receiving apparatus 11 to transmit analog video and audio, since digital data exchanged via the second LAN terminal 22 is data only for a control system.

Furthermore, this second LAN terminal 22 can be connected to a network 32 such as the Internet via a broadband router 31 connected to the hub 26, and is used to exchange data with a remote PC 33 and a site 34 of an information provider that provides a content provision service via the network 32.

The USB terminal 23 is used as a general USB-compatible port, and is used to connect USB apparatuses such as a portable phone 36, digital camera 37, card reader/writer 38 for a memory card, HDD 39, and keyboard 40 via a hub 35, and to exchange data with these USB apparatuses.

FIG. 2 shows a principal signal processing system of the aforementioned digital television broadcast receiving apparatus 11. That is, a satellite digital broadcast signal received by a digital DBS receiving antenna 43 is supplied to a satellite digital broadcast tuner 45 via an input terminal 44, thus tuning a broadcast signal of a desired channel.

The broadcast signal tuned by this tuner 45 is supplied to a phase-shift keying (PSK) demodulator 46 to demodulate a transport stream (TS). This TS is supplied to a TS decoder 47 and is decoded to obtain digital video and audio signals, which are then output to a signal processor 48.

A terrestrial digital television broadcast signal received by a terrestrial broadcast receiving antenna 49 is supplied to a terrestrial digital broadcast tuner 51 via an input terminal 50, thus tuning a broadcast signal of a desired channel.

The broadcast signal tuned by this tuner 51 is supplied to an orthogonal frequency division multiplexing (OFDM) demodulator 52 to demodulate a TS. This TS is supplied to a TS decoder 53 and is decoded to obtain digital video and audio signals, which are then output to the signal processor 48.

A terrestrial analog television broadcast signal received by the terrestrial broadcast receiving antenna 49 is supplied to a terrestrial analog broadcast tuner 54 via the input terminal 50, thus tuning a broadcast signal of a desired channel. The broadcast signal tuned by this tuner 54 is supplied to an analog demodulator 55 and is demodulated to obtain analog video and audio signals, which are then output to the signal processor 48.

The signal processor 48 selectively applies predetermined digital signal processing to the digital video and audio signals supplied from the TS decoders 47 and 53, and outputs the processed signals to a graphic processor 56 and audio processor 57.

To the signal processor 48, a plurality (four in FIG. 2) of input terminals 58*a*, 58*b*, 58*c*, and 58*d* are connected. These input terminals 58*a* to 58*d* are used to allow an apparatus outside the digital television broadcast receiving apparatus 11 to input analog video and audio signals.

The signal processor 48 selectively converts analog video and audio signals respectively supplied from the analog demodulator 55 and input terminals 58*a* to 58*d* into digital signals, applies predetermined digital signal processing to these digital video and audio signals, and then outputs the processed signals to the graphic processor 56 and audio processor 57.

Of these processors, the graphic processor 56 has a function of superimposing an on-screen display (OSD) signal generated by an OSD signal generator 59 on the digital video signal supplied from the signal processor 48, and outputting that digital video signal. This graphic processor 56 can selectively output the output video signal from the signal processor 48 and the output OSD signal from the OSD signal generator 59, and can output these outputs to combine them to form halves of the screen.

The digital video signal output from the graphic processor 56 is supplied to a video processor 60. This video processor 60 converts the input digital video signal into an analog video signal in a format that can be displayed on the video display 14, and outputs the analog video signal to the video display 14 to display a video. The video processor 60 also externally outputs the analog video signal via an output terminal 61.

The audio processor 57 converts the input digital audio signal into an analog audio signal in a format that can be played back by the loudspeakers 15, and outputs the analog audio signal to the loudspeakers 15 to play back an audio. The audio processor 57 also externally outputs the analog audio signal via an output terminal 62.

All the operations including various receiving operations described above of the digital television broadcast receiving apparatus 11 are mainly controlled by a controller 63. This controller 63 incorporates a central processing unit (CPU) 63*a*, which receives operation data from the console 16 or operation data which is sent from the remote controller 17 and is received by the light receiving module 18, and controls respective modules to reflect the nature of the operation.

In this case, the controller 63 mainly uses a read-only memory (ROM) 63*b* which stores control programs to be executed by the CPU 63*a*, a random access memory (RAM) 63*c* which provides a work area to the CPU 63*a*, and a non-volatile memory 63*d* which stores various kinds of setting data and control data.

The controller 63 is connected to the first LAN terminal 21 via a communication interface 68. Thus, the controller 63 can exchange data with the LAN-compatible HDD 25 connected to the first LAN terminal 21 via the communication interface 68. In this case, the controller 63 has a Dynamic Host Configuration Protocol (DHCP) server function, and controls the LAN-compatible HDD 25 connected to the first LAN terminal 21 by assigning an Internet Protocol (IP) address to it.

Furthermore, the controller 63 is connected to the second LAN terminal 22 via a communication interface 69. Thus, the controller 63 can exchange data with the apparatuses connected to the second LAN terminal 22 (see FIG. 1) via the communication interface 69. In this case, the controller 63 functions to access a specific site 34 managed by an arbitrary server via the network 32 based on a user's operation, and to browse a desired service or to acquire content.

At this time, the controller 63 functions to receive the content transmitted from the specific site 34 and to execute, based on the received content, video display processing on the video display 14 and audio playback processing from the loudspeakers 15 or to record the content in, e.g., recording/playback apparatuses such as the HDDs 25, 27, and 39.

That is, the digital television broadcast receiving apparatus 11 has a playback function of executing at least one of processing of the content acquired from the site 34 to display a video on the video display 14 and processing of the content acquired from the site 34 to output an audio from the loudspeakers 15.

The controller 63 is connected to the USB terminal 23 via a USB interface 70. Thus, the controller 63 can exchange data with the apparatuses connected to the USB terminal 23 (see FIG. 1) via the USB interface 70.

The controller 63 includes a browser module 63e. This browser module 63e implements a function to access a specific site 34 managed by an arbitrary server via the network 32, and to browser a service published on the accessed site 34 or to acquire desired content from the site 34, as described above.

FIG. 3 shows the outer appearance of the remote controller 17. This remote controller 17 mainly has a Power key 17a, input switching key 17b, direct selection keys 17c of satellite digital broadcast channels, direct selection keys 17d of terrestrial broadcast channels, Quick key 17e, cursor keys 17f, Enter key 17g, Program Guide key 17h, page switching keys 17i, Face Net (navigation) key 17j, Return key 17k, End key 17l, blue, red, green, and yellow color keys 17m, channel up-down key 17n, volume control key 17o, Menu key 17p, and the like.

Figure 4:
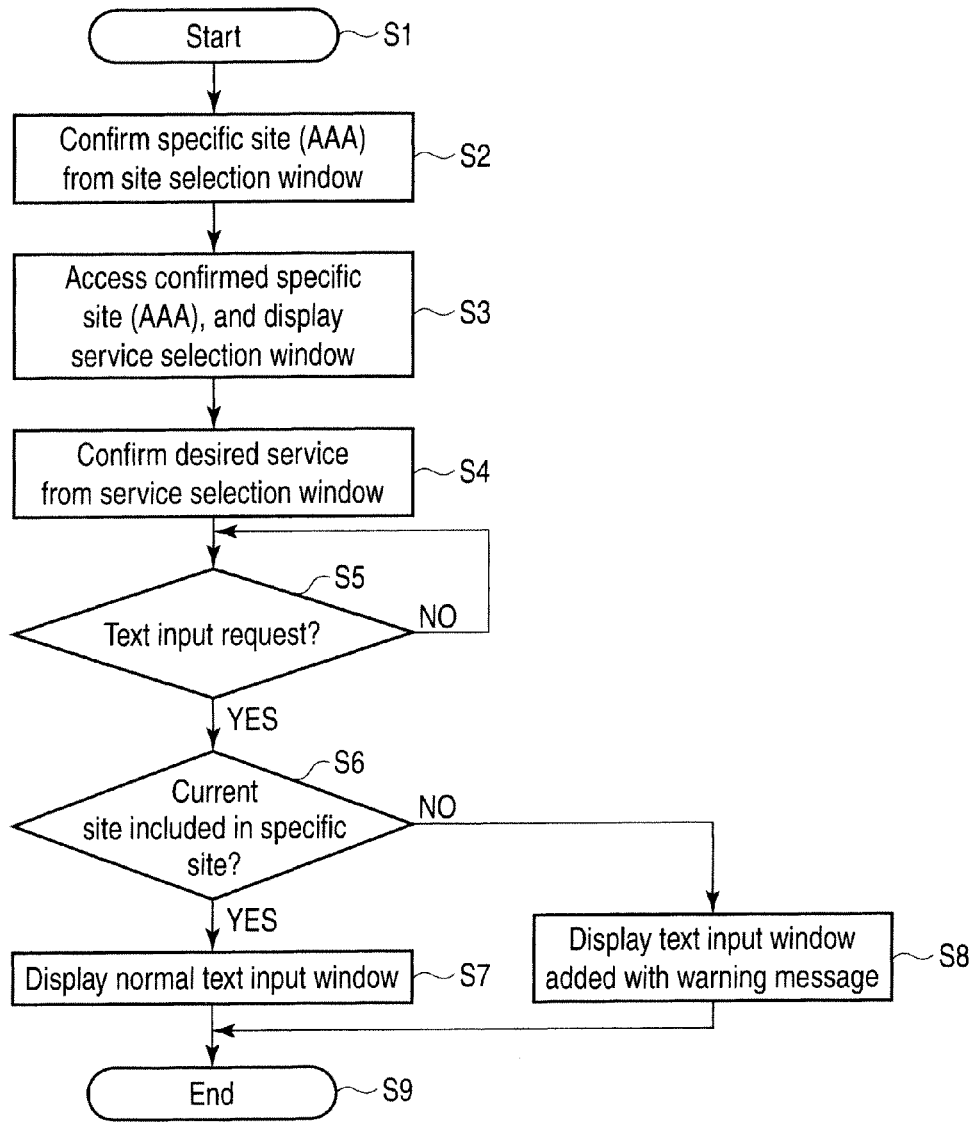
FIG. 4 is a flowchart for explaining the principal processing operations to be executed by the digital television broadcast receiving apparatus according to the embodiment.
Figure 5:
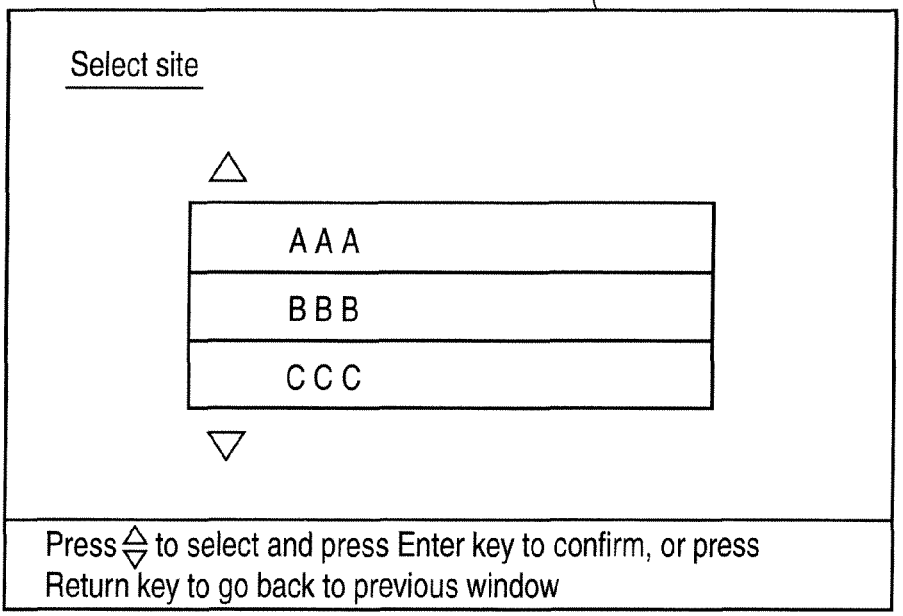
FIG. 5 is a view for explaining an example of a site selection window displayed on the digital television broadcast receiving apparatus according to the embodiment.

FIG. 4 is a flowchart which summarizes the principal processing operations in the digital television broadcast receiving apparatus 11. This processing starts (step S1) when the user displays a site selection window 72 shown in FIG. 5 on the video display 14 by operating the Menu key 17p of the remote controller 17 and entering a menu window having a hierarchical structure.

This site selection window 72 displays a plurality of site names (information provider names) "AAA", "BBB", "CCC", . . . accessible by the browser module 63e. The user selects a specific site 34 to be accessed in the site selection window 72 in step S2.

This specific site 34 is selected when the user selects an arbitrary site name in the site selection window 72 by operating the up or down cursor key 17f of the remote controller 17 and then confirms that site name by operating the Enter key 17g of the remote controller 17. Note that the specific site 34 can also be selected by providing a module that allows the user to directly input a URL address. However, it is convenient for the user to select a site using such a site selection window 72.

Figure 6:
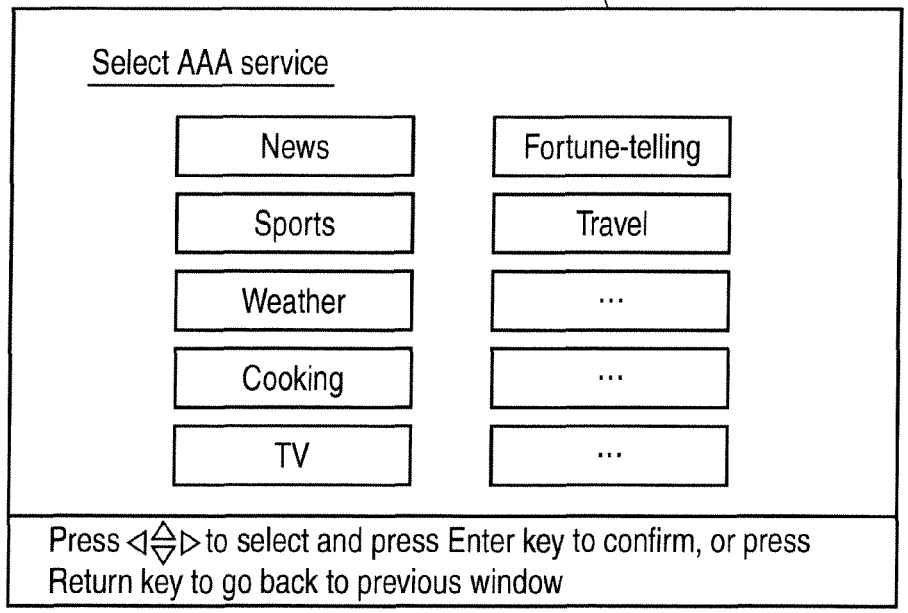
FIG. 6 is a view for explaining an example of a service selection window displayed on the digital television broadcast receiving apparatus according to the embodiment.

After the specific site (for example, AAA) 34 is confirmed, the controller 63 accesses that specific site (AAA) 34, and displays a service selection window 73 shown in FIG. 6 as a portal page of the specific site (AAA) 34 on the video display 14 in step S3.

This service selection window 73 displays a plurality of service names "news", "sports", "weather", "cooking", "TV", "fortune-telling", "travel", . . . that can be browsed on the specific site (AAA) 34. The user selects a service that he or she wants to browse in the service selection window 73 in step S4.

This service can also be selected when the user selects an arbitrary service name in the service selection window 73 by operating the right, left, up, or down cursor key 17f of the remote controller 17 and then confirms the service name by operating the Enter key 17g of the remote controller 17.

A case will be examined below wherein after the service to be browsed is confirmed, the user repeats operations to browse another service linked in the service during browsing of that service, and to then browse still another service linked in the linked service.

In this case, the user may jump to another site other than the specific site 34 accessed first without even noticing, and may browse a service on that site. In this case, when the user carelessly inputs, e.g., his or her user ID and password to log on to a service to be browsed, user's personal information may externally leak.

Especially, there is a malicious site which spoofs the specific site 34 selected first by the user, i.e., an unmalicious site, and neatly guides the user to input personal information. Hence, the user has to take extra care when he or she is required to input self information.

Hence, in this embodiment, the controller 63 checks in step S5 if the site side requests the user to input text data while the user is browsing the service, as described above. In this case, text data required to be input includes that associated with user's personal information such as a user ID and password.

If it is determined that the user is requested to input text data (YES), the controller 63 checks in step S6 if the currently accessed site is at least a site included in the specific site (AAA) 34 selected by the user in the site selection window 72. This checking process is attached by determining if identification data (for example, a domain name included in a uniform resource locator [URL] of that site) used to identify the currently accessed site is included in that of the specific site (AAA) 34 selected by the user in the site selection window 72.

Figure 7:
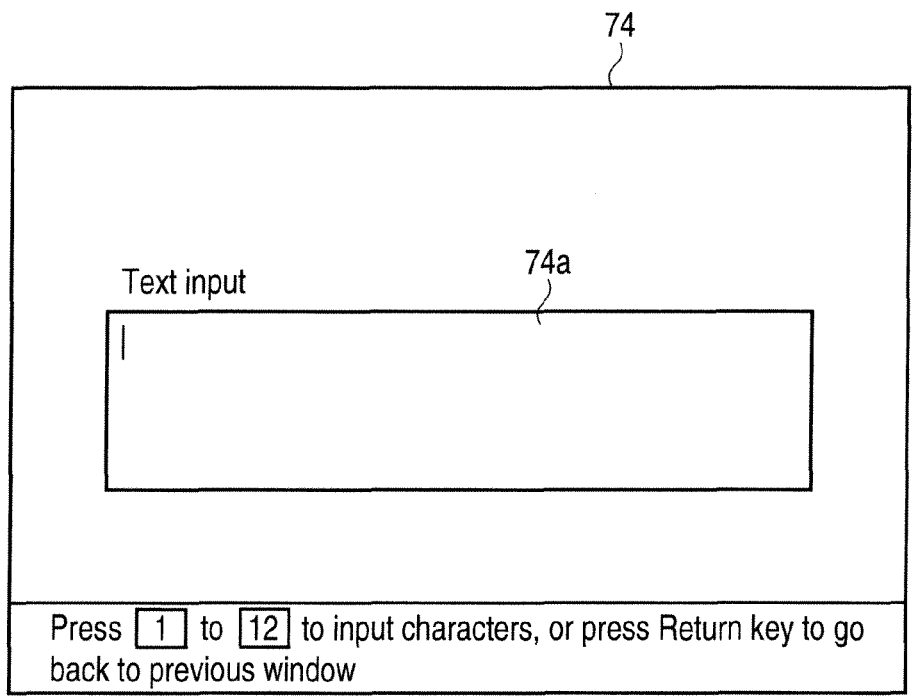
FIG. 7 is a view for explaining an example of a text input window displayed on the digital television broadcast receiving apparatus according to the embodiment.

If it is determined that the currently accessed site is included in the specific site (AAA) 34 (YES), the controller 63 displays a normal text input window 74 requested by the currently accessed site on the video display 14 in step S7, as shown in FIG. 7, and then ends the processing (step S9).

In this text input window 74, the user can input kana-kanji characters, alphanumeric characters, and the like in a text display field 74a using the direct selection keys 17d of terrestrial broadcast channels of the remote controller 17.

Figure 8:
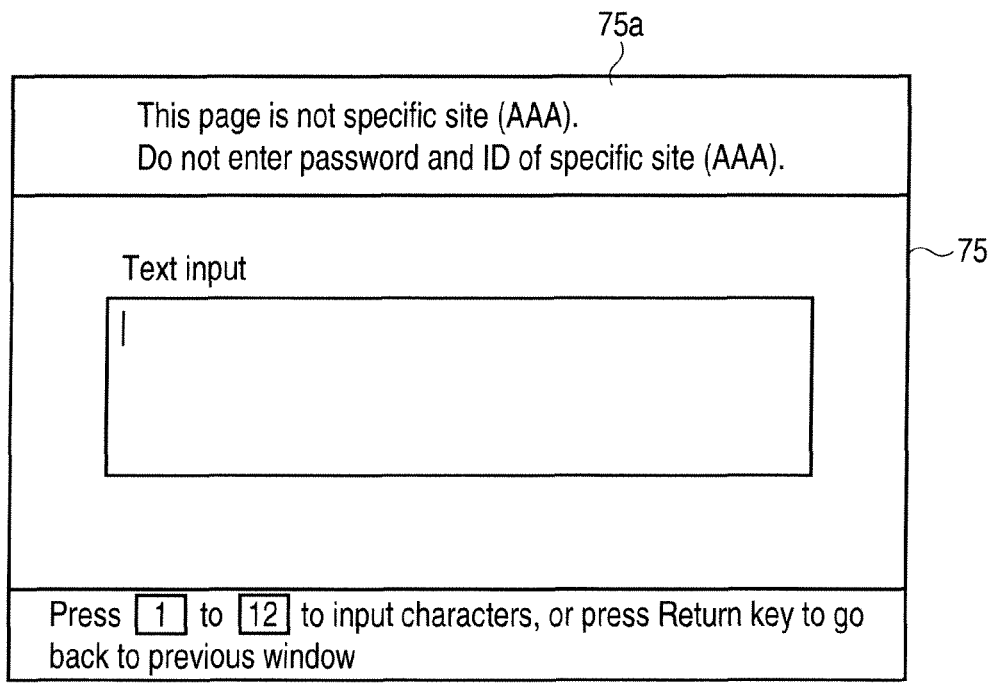
FIG. 8 is a view for explaining another example of a text input window displayed on the digital television broadcast receiving apparatus according to the embodiment.

On the other hand, if it is determined in step S6 that the currently accessed site is not included in the specific site (AAA) 34 (NO), the controller 63 displays a text input window 75, which is requested by the currently accessed site and has added to it a warning message 75a, on the video display 14 in step S8, as shown in FIG. 8, and then ends the processing (step S9).

In this case, the warning message 75a added to the text input window 75 is of a form that makes the user suppress the input of text data, for instance, "This page is not specific site (AAA). Do not enter password and ID of specific site (AAA)."

In this embodiment, when a text input request is received during browsing of a service of a site, it is determined if the currently accessed site is at least a site included in the site selected by the user. If the currently accessed site is not included in the site selected by the user, the warning message 75a of a form that advises accordingly and makes the user suppress the input of text data is displayed in the text input window 75.

For this reason, when the user jumps to a non-selected site without even noticing, he or she can notice it, and can stop to input his or her personal information to the site at the jump destination, thus preventing personal information from carelessly leaking.

Especially, when the site at the jump destination is a secure, quality major site, this warning message 75a serves to inform the user that the site has changed and to call user's attention. On the other hand, when the site at the jump destination is a malicious site, the warning message 75a serves as a warning that prevents user's personal information from being stolen. Hence, the warning message 75a is effective for both the cases.

Note that the specific site 34 is desirably a site which was selected first by the user in the site selection window 72 displayed on the video display 14.

In this embodiment, when the currently accessed site has changed to a site which is not included in the specific site (AAA) 34, the warning message 75a is displayed in the text input window 75. However, the invention is not limited to this. For example, a message indicating that the site has changed may be displayed by means of a dedicated icon or the user may be informed of that fact by means of an warning sound or a voice message.

Figure 9:
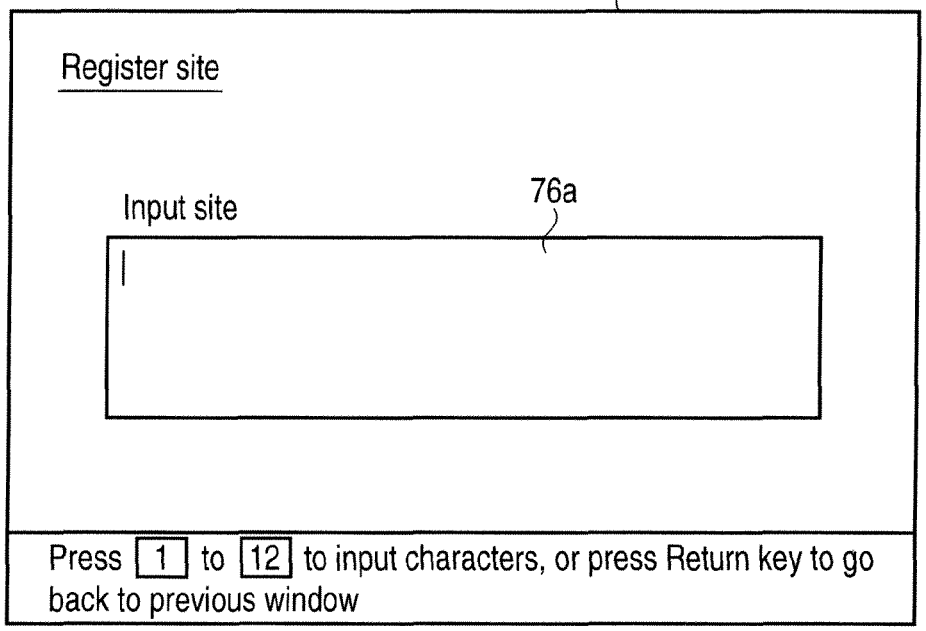
FIG. 9 is a view for explaining an example of a site registration window displayed on the digital television broadcast receiving apparatus according to the embodiment.

Furthermore, the user registers predetermined sites, and when he or she jumps to one of the registered sites, a warning may be inhibited from being generated even when a data input request is received. To implement this site registration, the user displays a site registration window 76 shown in FIG. 9 on the video display 14 by operating the Menu key 17p of the remote controller 17 and entering the menu window having the hierarchical structure.

In this site registration window 76, the user can register a site by inputting, e.g., a domain name of a site that he or she wants to register in a site input field 76a using an alphanumeric character input function by means of the direct selection keys 17d of terrestrial broadcast channels of the remote controller 17, and by operating the Enter key.

Figure 10:
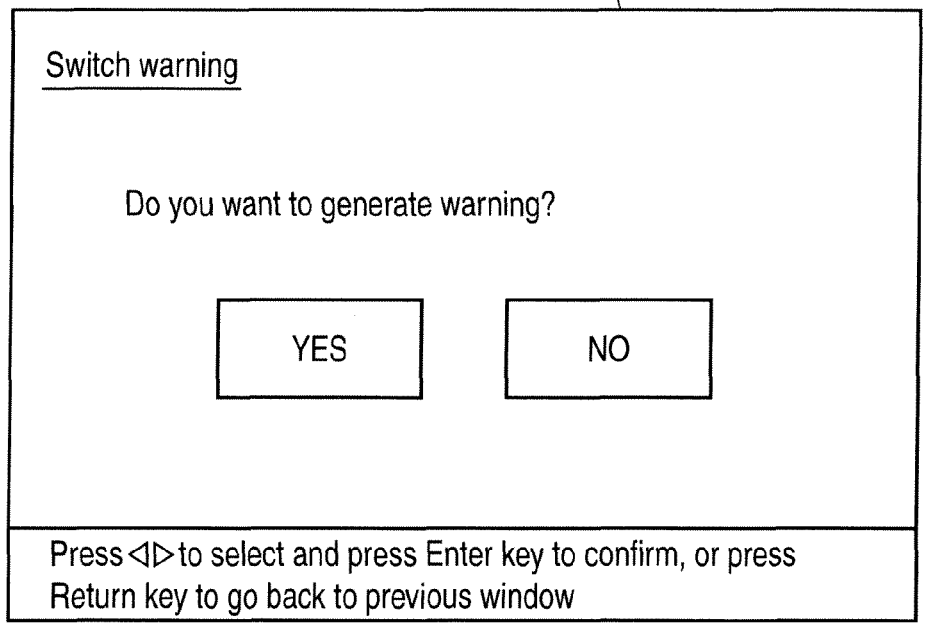
FIG. 10 is a view for explaining an example of a warning switching window displayed on the digital television broadcast receiving apparatus according to the embodiment.

Also, the user can selectively switch whether or not to generate a warning when the currently accessed site has changed to a site which is not included in the specific site (AAA) 34. To implement this switching, the user displays a warning switching window 77 shown in FIG. 10 on the video display 14 by operating the Menu key 17p of the remote controller 17 and entering the menu window having the hierarchical structure.

This warning selection window 77 displays, to the user, a question "Do you want to generate warning?" and items "YES" and "NO". Then, the user selects one of the items "YES" and "NO" by operating the right or left cursor key 17f of the remote controller 17, and confirms the selected item by operating the Enter key 17g of the remote controller 17, thus implementing the switching.

The user can acquire a list of malicious sites and hazardous sites from a predetermined quality site or another well-intentioned site. When such list is acquired, and when the user jumps to a site included in that list, the controller 63 of the digital television broadcast receiving apparatus 11 can clear a text input window requested by that site, and can forcibly inhibit the user from inputting text data. Alternatively, the controller 63 temporarily displays a text input window, and then automatically clears that window to forcibly inhibit the user from inputting text data. In this case, it is convenient for the user to display, for example, a message "text input is inhibited since malicious site is accessed" on the video display 14.

This embodiment has exemplified the digital television broadcast receiving apparatus 11. However, the invention is not limited to such specific apparatus, but can be widely applied to, e.g., a set-top box (STB), portable phone, and the like.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content playback apparatus which accesses a specific site selected on a site selection window displaying a plurality of sites via a network to acquire desired content from the specific site and playback the acquired content, the content playback apparatus having a controller comprising:
a non-transitory storage memory;
a first control logic configured to store information of the site selection window and identification data of the specific site to be selected on the site selection window;
a second control logic configured to generate the site selection window by using the information of the site selection window;
a third control logic configured to determine, when a window indicating a data input request is displayed from a currently accessed site, whether or not the currently accessed site is at least a site included in the specific site selected on the site selection window by using the identification data;
a fourth control logic configured to generate, when the third control logic determines that the currently accessed site is not included in the specific site, a warning that advises accordingly, wherein the warning is executed according to a warning video display or a sound output, when the currently accessed site requests a user to input a user ID; and
a fifth control logic configured to forcibly inhibit a data input requested from a site included in a list, which is acquired in advance via the network.

2. The apparatus of claim 1, wherein the third control logic is configured to compare identification data given to the currently accessed site with identification data given to the specific site, and to determine whether or not the currently accessed site is at least the site included in the specific site.

3. The apparatus of claim 1, wherein the third control logic is configured to compare a domain name included in a URL of the currently accessed site with a domain name included in a URL of the specific site, and to determine whether or not the currently accessed site is at least the site included in the specific site.

4. The apparatus of claim 1, wherein the controller is configured to generate, when the third control logic determines that the currently accessed site is not at least the site included in the specific site, the warning that advises accordingly by a video display and an audio output.

5. The apparatus of claim 1, wherein the controller is configured to generate, when the third control logic determines that the currently accessed site is not at least the site included in the specific site, a warning which additionally video-displays a message that advises accordingly in a text input window requested by the currently accessed site.

6. The apparatus of claim 1, further comprising: a sixth control logic configured to register a site for which a warning is not generated even when a data input request is received from that site.

7. The apparatus of claim 1, wherein the fourth control logic is configured to generate, when the third control logic determines that the currently accessed site is not at least the site included in the specific site, a warning indicating that an input of personal information regarding the specific site is inhibited by at least one of a video display and a sound output.

8. A content playback apparatus which accesses a specific site selected on a site selection window displaying a plurality of sites via a network to acquire desired content from the specific site and playback the acquired content, the content playback apparatus having a controller comprising:

a non-transitory storage memory;

a first control logic configured to store in the non-transitory storage memory information of the site selection window and identification data of the specific site to be selected on the site selection window;

a second control logic configured to generate the site selection window by using the information of the site selection window;

a third control logic configured to determine, when a window is displayed that requires a data input on a currently accessed site, whether or not the currently accessed site is at least a site included in the specific site selected on the site selection window by using the identification data;

a fourth control logic configured to generate, when the third control logic determines that the currently accessed site is not included in the specific site, a warning indicating that a data input is inhibited, and wherein the warning is executed by a warning video display or a sound output, when the currently accessed site requests a user to input a user ID; and a fifth control logic configured to forcibly inhibit a data input requested from a site included in a list, which is acquired in advance via the network.

9. A content playback method which accesses by a content playback apparatus a specific site selected on a site selection window displaying a plurality of sites via a network to acquire desired content from the specific site and playback the acquired content, wherein the content playback apparatus having a controller, the method comprising:

generating by a second control logic included in the controller the site selection window by using the information of the site selection window stored by a first control logic, wherein the controller includes a non-transitory storage memory and the first control logic configured to store in the non-transitory storage memory information of the site selection window and identification data of the specific site to be selected on the site selection window;

determining, by a third control logic included in the controller, when a window requiring a data input is displayed from a currently accessed site, whether or not the currently accessed site is at least a site included in the specific site selected on the site selection window by using the identification data; and generating, when it is determined by the third control logic that the currently accessed site is not included in the specific site, a warning that advises accordingly by a fourth control logic included in the controller, wherein the warning is executed according to a warning video display or a sound output, when the currently accessed site requests a user to input a user ID; and a fifth control logic configured to forcibly inhibit a data input requested from a site included in a list, which is acquired in advance via the network.

* * * * *